Sept. 24, 1929.  C. W. HUGHETT  1,729,389
POISON CONTAINER
Filed April 5, 1928
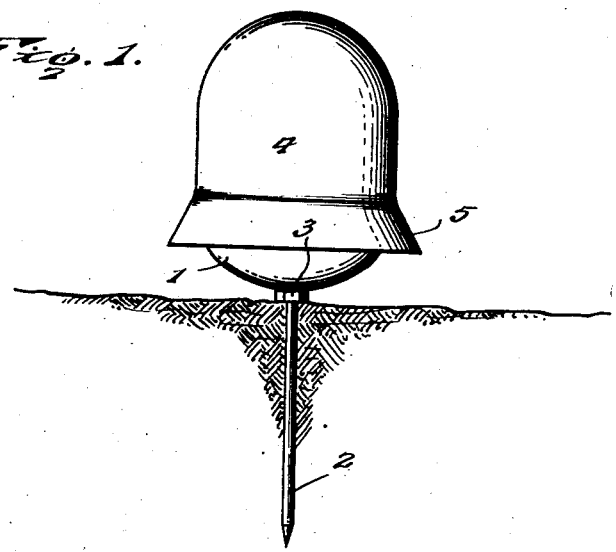
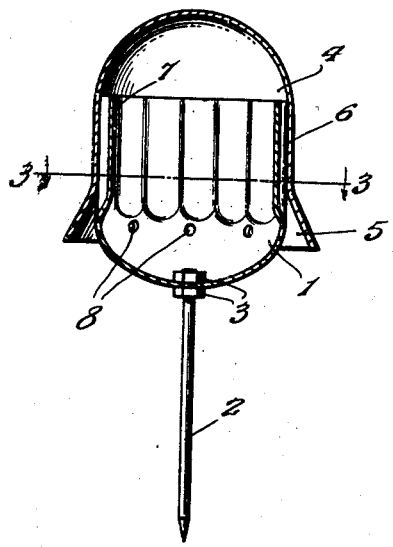
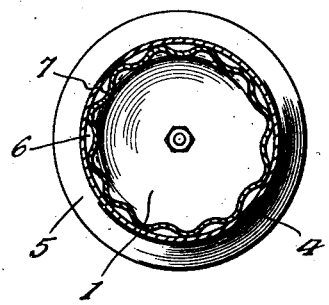
Inventor
C. W. Hughett.

Patented Sept. 24, 1929

1,729,389

UNITED STATES PATENT OFFICE

CLARENCE W. HUGHETT, OF FRESNO, CALIFORNIA

POISON CONTAINER

Application filed April 5, 1928. Serial No. 267,718.

The object of this invention is to provide a simple, inexpensive and efficient device whereby an insecticide may be stored at a point of use in such a manner as to be accessible to the insects to be destroyed. The invention provides a device intended more particularly for use in destroying ants which infest lawns or trees, and one object of the invention is to provide a device which may be anchored at a point infested by the ants and which will be firmly held but which will be of such a construction that the poison will be freely accessible to the ants. Another object of the invention is to provide a container in which the poison will be protected from the weather or from the spray from a garden hose or other extraneous means which tend to dilute or entirely destroy the poison. Another object of the invention is to provide a container having the stated characteristics which may be readily refilled when necessary. These stated objects, and other objects which will incidentally appear in the course of the following description, are attained in such a device as is illustrated in the accompanying drawing, and the invention resides in certain novel features which will be particularly pointed out in the appended claims.

In the drawing:

Figure 1 is an elevation of a device embodying the invention showing the same anchored in the ground;

Fig. 2 is a diametrical section thereof, and

Fig. 3 is a horizontal section on the line 3—3 of Fig. 2.

The container embodying my invention comprises a cup 1 which is open at its upper end and has a substantially bell-shaped bottom, as clearly shown in Figs. 1 and 2. Rigidly secured to the bottom of the cup in any approved manner is a spike 2 which is adapted to be driven in the ground so as to anchor the cup at any desired point or to pierce the limb of a tree which may be infested so as to secure the cup in an upright position on the limb. This anchoring spike may be of any length most suitable for the particular use to which the device is to be put, it being obvious that a short spike will suffice where the device is to be applied to a tree limb and a longer spike is desirable when the device is placed in a lawn. The spike may be welded to the cup but is illustrated as having its upper end inserted through an opening provided therefor in the bottom of the cup and rigidly secured therein by clamp nuts 3 mounted upon the spike at the opposite sides of the cup bottom, as will be understood upon reference to Fig. 2. Fitting over the cup is a hood or cap 4 which has an internal diameter substantially equal to the external diameter of the cup so that the cover or hood will be firmly held against displacement. The top of the cover is imperforate and is preferably hemispherical so that it will effectually shed water in an obvious manner. The lower edge or rim of the hood is flared, as shown at 5, in order that it may deflect from the cup any water which may tend to fall upon the device and also provide an ample passage or opening through which the ants may pass to the interior of the device and fumes from the poison may escape to meet the ants seeking entrance. Passages 6 are provided between the walls of the cup and the hood, and in the drawing these passages are provided by forming corrugations 7 in the wall of the cup, but it will be understood, of course, that the corrugations may be formed in the wall of the hood while the wall of the cup may retain its cylindrical form. I have also illustrated small openings 8 in the bottom of the cup to permit access of the insects to the cup but these openings are not essential and may be omitted inasmuch as the corrugations, whether in the cup or in the hood, furnish ample inlets for the ants.

The device is intended to be applied to the limb of a tree in the path of the ants which infest the tree or to be set in a lawn adjacent the ant holes. Any insecticide which has been found to be efficient in destroying ants may be employed and the insecticide is placed in the cup, after which the hood or cover is fitted down over the cup, as shown, so that the sun or the rain will be prevented from having access to the cup. It has been found that the ants are attracted by the odor of the insecticide and endeavor to reach the same so that they will travel under the hood and up through the passages provided by the corrugations. It has also been found that the heat of the sun playing upon the hood will vaporize the insecticide and the fumes thus created will pass out through the corrugations and spread over the surface of the ground or the limb of the tree so that they will reach the ants at points somewhat remote from the device. The frictional engagement between the hood and the cup effectually retains the hood in place while it may be easily withdrawn with a slight force when the supply of poison is to be replenished. The device may be very cheaply produced and may be made in various sizes as preferred while its form is such that it may be used in large numbers without detracting perceptibly from the neat appearance of any lawn.

Having thus described the invention, I claim:

1. A device for the purpose set forth comprising a cup, means for anchoring the cup at a point of use, and a hood engaged frictionally around the cup with its lower end adjacent but spaced vertically from the bottom of the cup, vertically extending recesses being formed between the side of the cup and the side of the hood with their lower ends at the bottom of the hood and their upper ends at the top of the cup.

2. A device for the purpose set forth comprising a cup, and a hood fitting around the cup and in frictional contact with the sides of the cup at spaced points in the area thereof whereby to define passages extending from the bottom of the hood to the top of the cup, the lower end of the hood being flared and the top of the hood arching over the cup.

3. A device for the purpose set forth comprising a cup, an anchor secured to the bottom of the cup, vertically extending corrugations in the side of the cup, and a hood having an imperforate top and having its side frictionally engaged with the side of the cup and its lower end flared outwardly around the cup.

In testimony whereof I affix my signature.

CLARENCE W. HUGHETT. [L. S.]